United States Patent [19]

Fritz et al.

[11] Patent Number: 5,299,063
[45] Date of Patent: Mar. 29, 1994

[54] CROSS PROJECTION VISOR HELMET MOUNTED DISPLAY

[75] Inventors: Bernard S. Fritz; Teresa A. Fritz, both of Eagan, Minn.

[73] Assignee: Honeywell, Inc., Minneapolis, Minn.

[21] Appl. No.: 973,875

[22] Filed: Nov. 10, 1992

[51] Int. Cl.⁵ .................. G02B 27/14; G09G 3/02; H04N 13/00
[52] U.S. Cl. .................. 359/631; 359/434; 359/630; 345/7; 348/115
[58] Field of Search .............. 359/625–627, 359/629–633, 639, 13–14, 362–364, 423, 434–435, 196; 340/700, 702, 705, 980; 351/158; 358/88, 103, 250

[56] References Cited

U.S. PATENT DOCUMENTS

| | | | |
|---|---|---|---|
| 3,737,212 | 6/1973 | Antonson et al. | 359/14 |
| 4,167,113 | 9/1979 | Mann | 359/637 |
| 4,218,111 | 8/1980 | Withrington et al. | 359/13 |
| 4,711,512 | 12/1987 | Upatnieks | 340/705 |
| 4,859,030 | 8/1989 | Rotier | 359/631 |
| 4,927,234 | 5/1990 | Banbury et al. | 359/630 |
| 5,035,473 | 7/1991 | Kuwayama et al. | 359/13 |
| 5,044,706 | 9/1991 | Chen | 359/357 |
| 5,129,716 | 7/1992 | Holakovszky et al. | 359/630 |
| 5,162,828 | 11/1992 | Furness et al. | 359/618 |

OTHER PUBLICATIONS

Nordwall, Bruce D., "New Helmet for Pilots to Combine Night Vision and Head-Up Display," *Aviation Week & Space Technology*, Nov. 1991, pp. 78–79.

Fritz et al., "Diffractive Optics for Broadband Infrared Imagers: Design Examples", Proceeding SPIE, vol. 1052 (1989).

*Primary Examiner*—Loha Ben
*Assistant Examiner*—Thong Nguyen

[57] ABSTRACT

A helmet mounted display utilizing a pair of image sources mounted low on the helmet of a pilot and projecting an image across in front of the pilot's face to the opposite partly reflecting portions of the visor of the helmet to create an image for each of the pilot's eyes, which image is combined with the scene being viewed through the visor by the pilot.

8 Claims, 2 Drawing Sheets

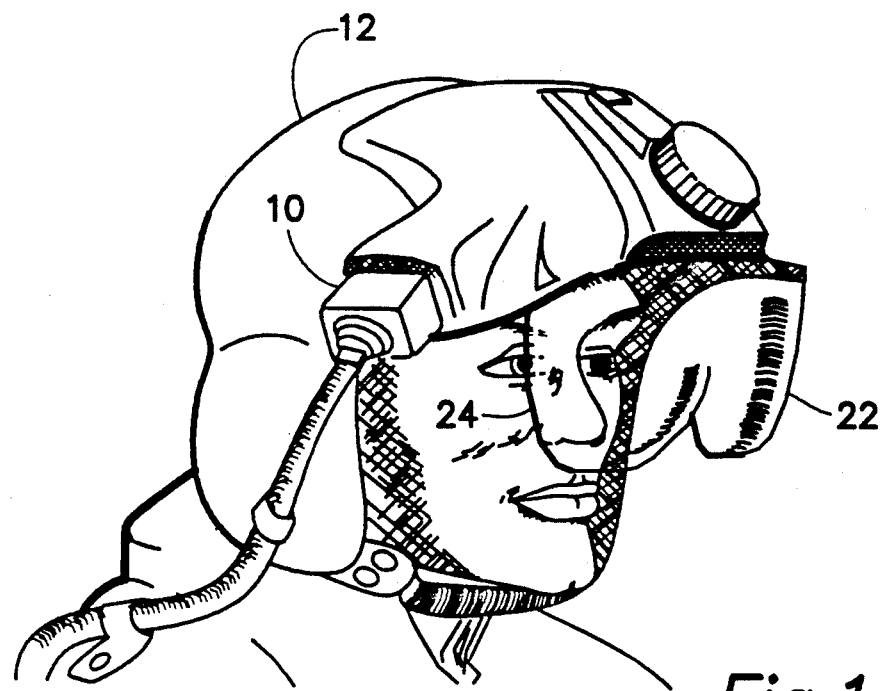
Fig.1
PRIOR ART
Fig.2
PRIOR ART
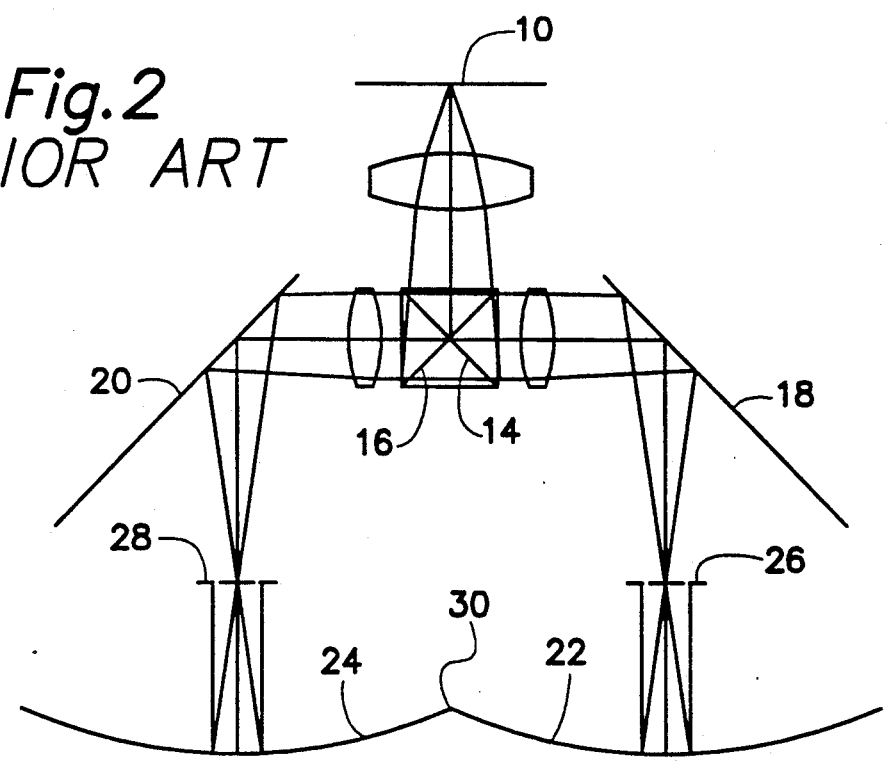

CROSS PROJECTION VISOR HELMET MOUNTED DISPLAY

BACKGROUND OF THE INVENTION

1. Field of the Invention

This invention relates to displays which have special utility in connection with attachments for helmets worn by aircraft pilots (helmet mounted displays) wherein an image of a desired display, such as information on the face of a cathode ray tube, can be introduced into the field of view being observed by the pilot so that the desired display is superimposed upon the scene being viewed in the pilot's line of sight.

2. Description of the Prior Art

Helmet mounted displays are well-known in the prior art and usually employ an optical system which receives an image of a desired display from a cathode ray tube and projects a collimated image thereof using a partially reflective surface, so that the image is viewed at infinity and is combined with the pilot sees through the aircraft windshield. In a U.S. Pat. No. 4,859,030 of Donald J. Rotier issued Aug. 22, 1989 and assigned to the assignee of the present invention, a helmet mounted display is shown wherein a combiner is mounted on the helmet in front of one of the pilot's eyes and includes a curved surface and a filter that receives light from an image to be superimposed on the scene being viewed by the operator through the windshield. The Rotier apparatus, although generally quite satisfactory, has several drawbacks by virtue of the combiner structure being attached to the helmet relatively close to the pilot's eye. This proximity to the eye may present safety hazards to the pilot in the event that the helmet is knocked forward on his head. Furthermore, the optical elements utilized in the path from the cathode ray tube to the combiner are rather complicated and some elements are off center causing them to be very difficult to manufacture. Furthermore, being a monocular, both eyes do not see the same scene and, in the event of a cathode ray tube failure, the entire display is lost. Also, in the Rotier device, the apparatus mounting the combiner is close to the eye and gives obstruction to some directions of viewing.

Another prior art helmet mounted display is shown in FIGS. 1 and 2 of the present disclosure. In this prior art apparatus, a cathode ray tube shown generally by reference numeral 10 is mounted to the top portion of the helmet 12 of a pilot. A rather complex arrangement of optical elements, better seen in FIG. 2, operates as a relay for directing the image from the source 10 to a pair of reflecting surfaces 14 and 16 and then sidewise to a second pair of reflecting surfaces 18 and 20 where the images are reflected downwardly to a pair of partially reflecting surfaces 22 and 24. Reflected light from surfaces 22 and 24 is thereafter directed to the pupils 26 and 28 of the pilot's eyes and he views the desired image superimposed on his view of the scene through the surfaces 22 and 24. While this apparatus does provide dual images of the display being projected, it does not solve the problem of a cathode ray tube failure since only one is still used and, furthermore, because the optics has to be mounted high on the helmet, it presents a secondary hazard to the pilot in the event of ejection. The weight of the optical relay system on the top of the helmet produces a high center of gravity for the helmet on the pilot's head which, during ejection, could cause forces against the pilot's neck that could even result in breakage thereof. Another major problem encountered with the prior art apparatus of FIGS. 1 and 2 is the joining line between the two partially reflective surfaces 22 and 24 identified in FIG. 2 as a cusp 30. Cusp 30 obviously provides extremely undesirable distortion when the pilot attempts to look through the area of the cusp.

SUMMARY OF THE INVENTION

The present invention overcomes all of the problems of the prior art by providing a dual projection system employing two cathode ray tubes and mounting the cathode ray tubes on the side of the helmet to prevent raising the center of gravity thereof. The relay optics are considerably more simplified than the prior art and, in the arrangement of the present invention, when the visor of the helmet itself is utilized as the partially reflective surface to transmit the image of the display to the eyes of the pilot, a wider unobstructed field of view is presented than was possible with the Rotier apparatus. Also, with the visor being located relatively far from the pilot's eyes, the danger in the event the helmet is knocked forward is substantially eliminated.

In order to utilize the visor of the helmet, we have employed a relay optical system so mounted that the projection from one cathode ray tube crosses over the projection from the other cathode ray tube to the opposite sides of the visor in front of the pilot's eyes and each half of the visor then relays the image to one of the pilot's eyes thereby providing dual images. Because the shape of the visor does not curve back in the middle, most of the distortion produced by the cusp 30 of FIGS. 1 and 2 is also eliminated.

BRIEF DESCRIPTION OF THE DRAWINGS

FIG. 1 shows a pilot wearing a helmet and display system of the prior art;

FIG. 2 shows the optical ray trace of the system of FIG. 1 in the prior art;

DETAILED DESCRIPTION OF THE PREFERRED EMBODIMENT

Figure 3:
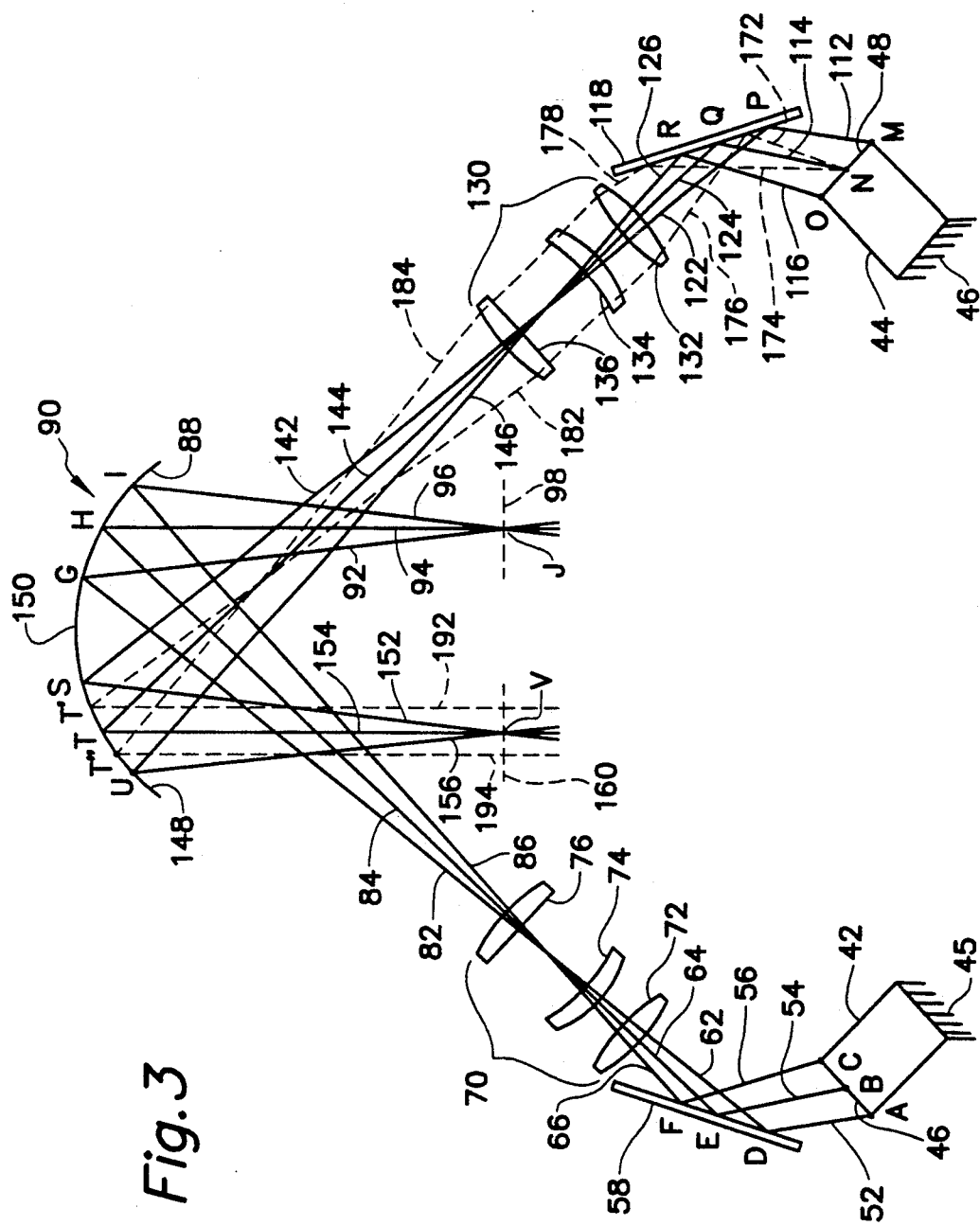
FIG. 3 shows the apparatus of the present invention.

Referring to FIG. 3, first and second image sources 42 and 44, which may be cathode ray tubes, are mounted on the sides of a helmet shown by hatched markings 45. Cathode ray tubes 42 and 44 have image surfaces 46 and 48 respectively, upon which a desired display such as instrument readings are presented. The image sources or cathode ray tubes 42 and 44 should be mounted on the sides of the helmet at about the level of the pilot's eyes so as to keep the center of gravity of the arrangement low for safety.

Light from the image on surface 46 is shown emanating from only three points A, B and C for simplicity. Light from these three points travels over paths such as 52, 54 and 56 to a reflecting surface 58 where they are reflected from points D, E and F along paths such as 62, 64 and 66 to an optical relay 70 containing lenses 72, 74 and 76. Relay 70 collects this light and directs it along paths such as shown by reference numerals 82, 84 and 86 to points G, H and I, respectively, of a partly reflective portion 88 of a helmet visor 90.

It is seen that rays 82, 84 and 86 travel from the left side of the helmet 45 across in front of the pilot's face to the partly reflective surface 88 on the right side of the visor 90. Visor portion 88 may be elliptical in form and operates to reflect and focus the light from points G, H and I along paths such as 92, 94 and 96 on the pilot's right eye 98 at point J.

It should be noted that the surface 88 of the visor is located a significant distance from the eyes of the pilot so as to avoid injury should the helmet move forward on the pilot's head.

The image on the surface 48 of the source or cathode ray tube 44 on the right side of the helmet 45 is shown as three points identified by letters M, N, and O for simplicity. Light from these points travels over paths identified by reference numerals 112, 114 and 116 to a second reflecting surface 118 where they are reflected from points identified by letters P, Q and R along lines 122, 124 and 126, respectively, to a second optical relay system 130 containing lenses 132, 134 and 136. Relay 130 collects this light and directs it along lines shown by reference numerals 142, 144 and 146, to points S, T and U, respectively, a second partly transparent portion 148 of visor 90. Again it is seen that the light from the right side of the helmet crosses over in front of the pilot's face to the left portion 148. Visor portion 148 is molded or otherwise connected to visor portion 88 in an area identified by reference numeral 150. It should be noted that area 150 is relatively smooth compared to the cusp 30 shown in FIG. 2 and, between points S and G, it can be rounded so as to provide very little distortion when the pilot looks through it.

Visor portion 148, like portion 88, may be elliptical in form and operates to reflect and focus the light from points S, T and U along paths such as 152, 154 and 156 on the pilot's left eye 160 at points V.

To show the collimating effects of the relay and visor optics 70, 130, 88 and 148, an example will be given from point N on image source 44. In addition to ray 114, rays 172 and 174 are shown emanating from point N to the reflecting surface 118 where they strike in the general vicinity of points P and R, respectively. Rays 172 and 174 are reflected from surface 118 along lines shown as dashed lines 176 and 178 to relay optics 130 and emerge therefrom along dashed lines 182 and 184, respectively. Rays 182 and 184 strike the elliptical surface 148 at points T' and T", respectively, and are reflected downwardly over paths shown as dashed lines 192 and 194, respectively. It should be noted that rays 192 and 194 are substantially parallel to the central ray 154 emanating from point N, i.e. collimated. The collimated rays 192, 194 and 154 enter the pilot's left eye 160 so that the image appears to be at infinity.

It is thus seen that we have provided a helmet mounted display which gives a low center of gravity for the optical system to improve safety, provide a relatively wide field of view, substantially eliminate the distortion of a cusp between the partly reflecting surfaces and provide dual image sources so that both eyes see the same image and, in the event of failure of one of the sources, the other will be able to provide the pilot with required information.

Many changes will occur to those skilled in the art without departing from the spirit and scope of the present invention. For example, while I have shown elliptical surfaces 88 and 148 as part of the visor, it is possible, under some circumstances, to make these more spherical. Likewise, the three-element optical relay system 70 and 130, although considerably simpler than the prior art, may include other elements when desired to eliminate additional aberrations that may exist.

I, therefore, do not wish to be limited by the specific disclosures used in connection with the description of the preferred embodiment but intend only to be limited by the following claims.

The embodiments of an invention in which an exclusive property or right is claimed are defined as follows:

1. A display system for use with a helmet having first and second sides and a partly reflective visor generally across a front side thereof to permit the eyes of a helmet wearer to observe a scene therethrough comprising:
   a first image source mounted on the first side of the helmet approximately at the level of the wearer's eyes; and
   a first optical relay mounted to receive an image from the first image source and direct it across the helmet to a first portion of the visor on the second side of the helmet, the first portion reflecting the image to a first eye of the wearer.

2. Apparatus according to claim 1 wherein the first portion of the visor combines the image from the first image source with the scene observed by the wearer for simultaneous viewing.

3. Apparatus according to claim 2 wherein the first optical relay operates to reimage the image from the first image source so that the image is viewed by the wearer at infinity.

4. Apparatus according to claim 3 wherein the first portion of the visor is substantially elliptical to collimate light from the first relay at the first eye of the wearer, which eye is nearest the second side of the helmet.

5. Apparatus according to claim 1 further including a second image source mounted on the second side of the helmet and a second optical relay for directing an image from the second source across the helmet to a second portion of the visor on the first side of the helmet, the second portion reflecting the image to a second eye of the wearer.

6. Apparatus according to claim 5 wherein the second portion of the visor combines the image from the second image source with the scene observed by the wearer for simultaneous viewing.

7. Apparatus according to claim 6 wherein the second optical relay operates to reimage the image from the second image source so that the image is viewed by the wearer at infinity.

8. Apparatus according to claim 7 wherein the second portion of the visor is substantially elliptical to collimate light from the second relay at the second eye of the wearer, which eye is nearest the first side of the helmet.

* * * * *